Feb. 20, 1951 P. M. OLIVER 2,542,425
DUMP BODY FOR TRUCKS
Filed Aug. 17, 1948 5 Sheets-Sheet 4
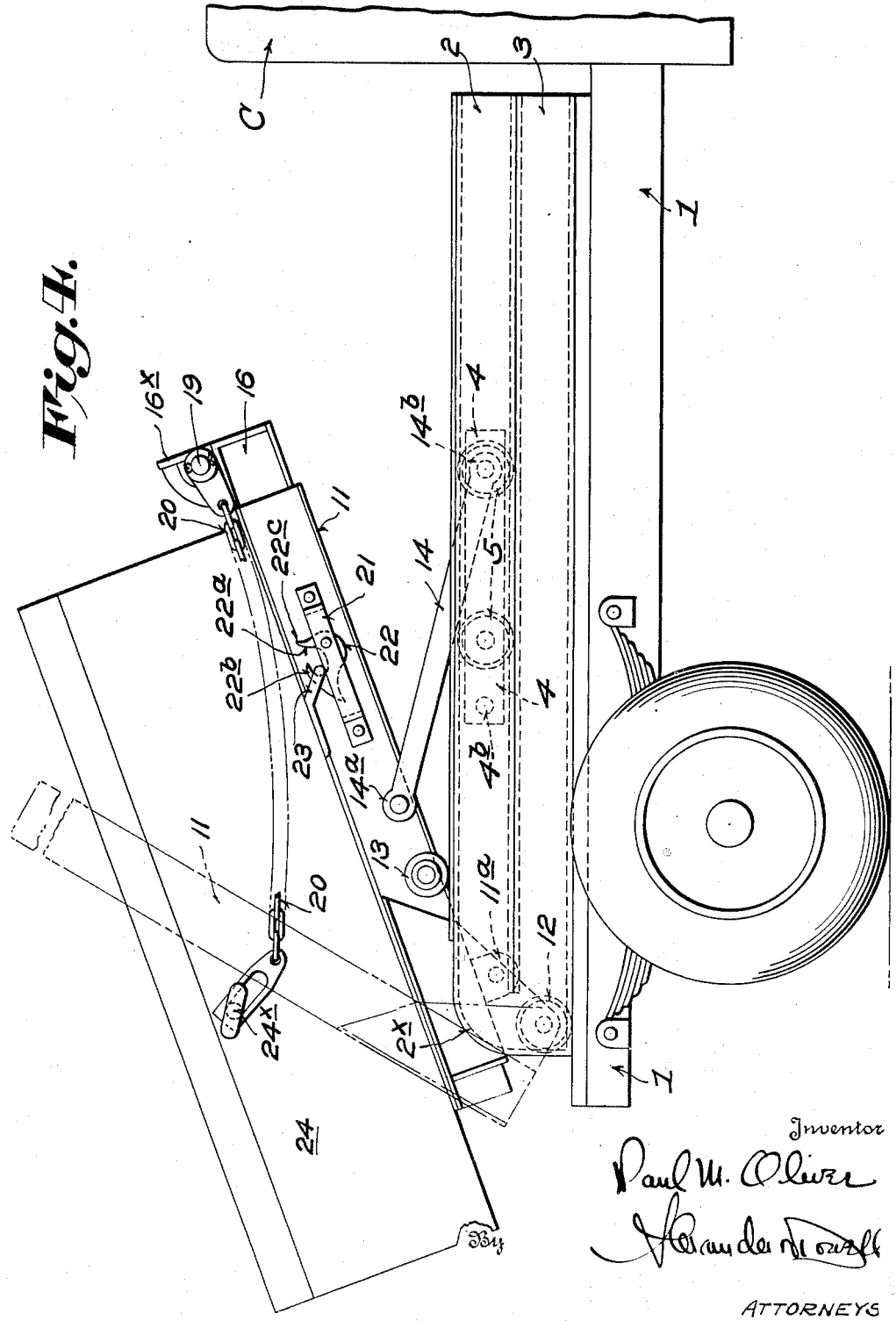

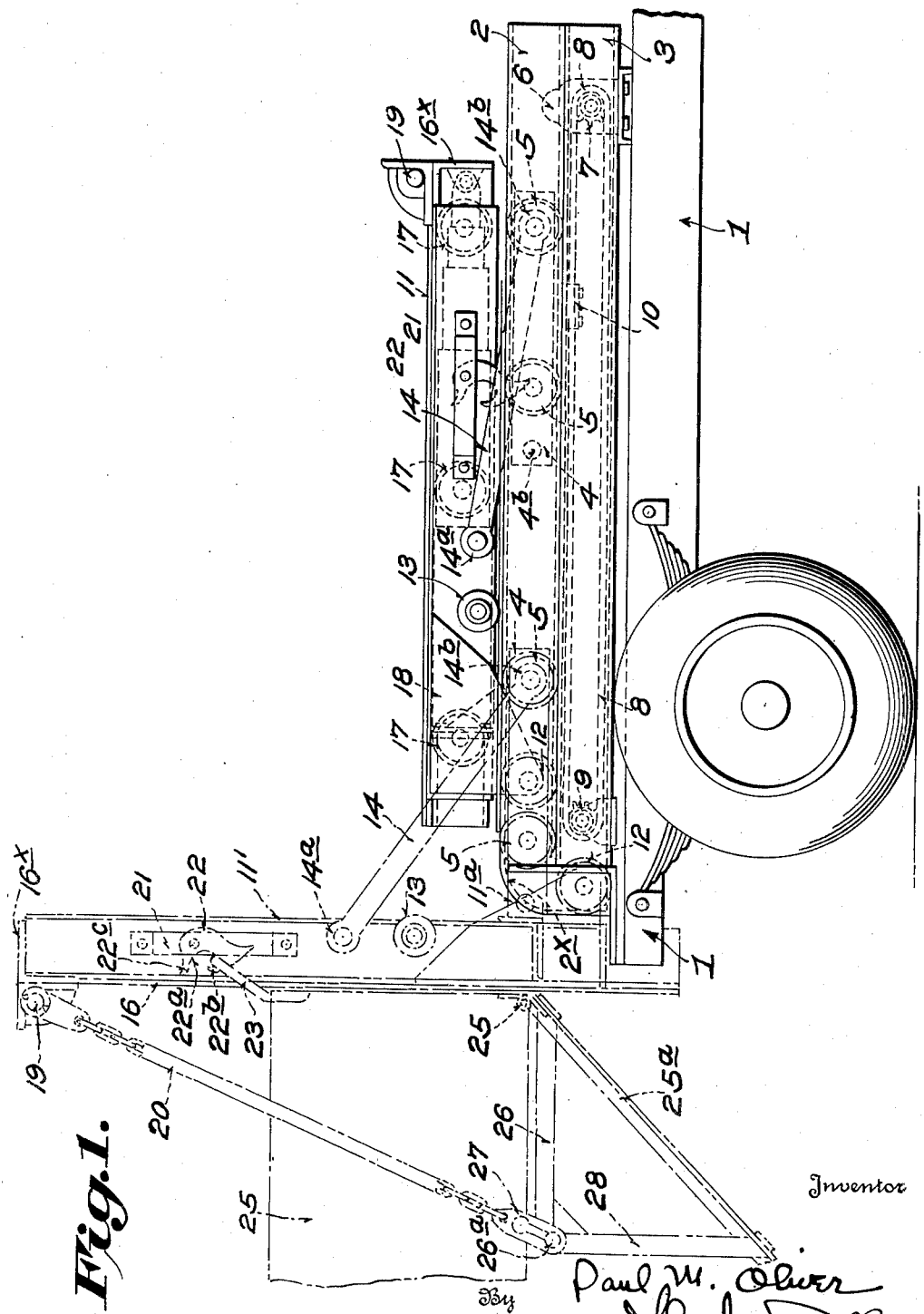

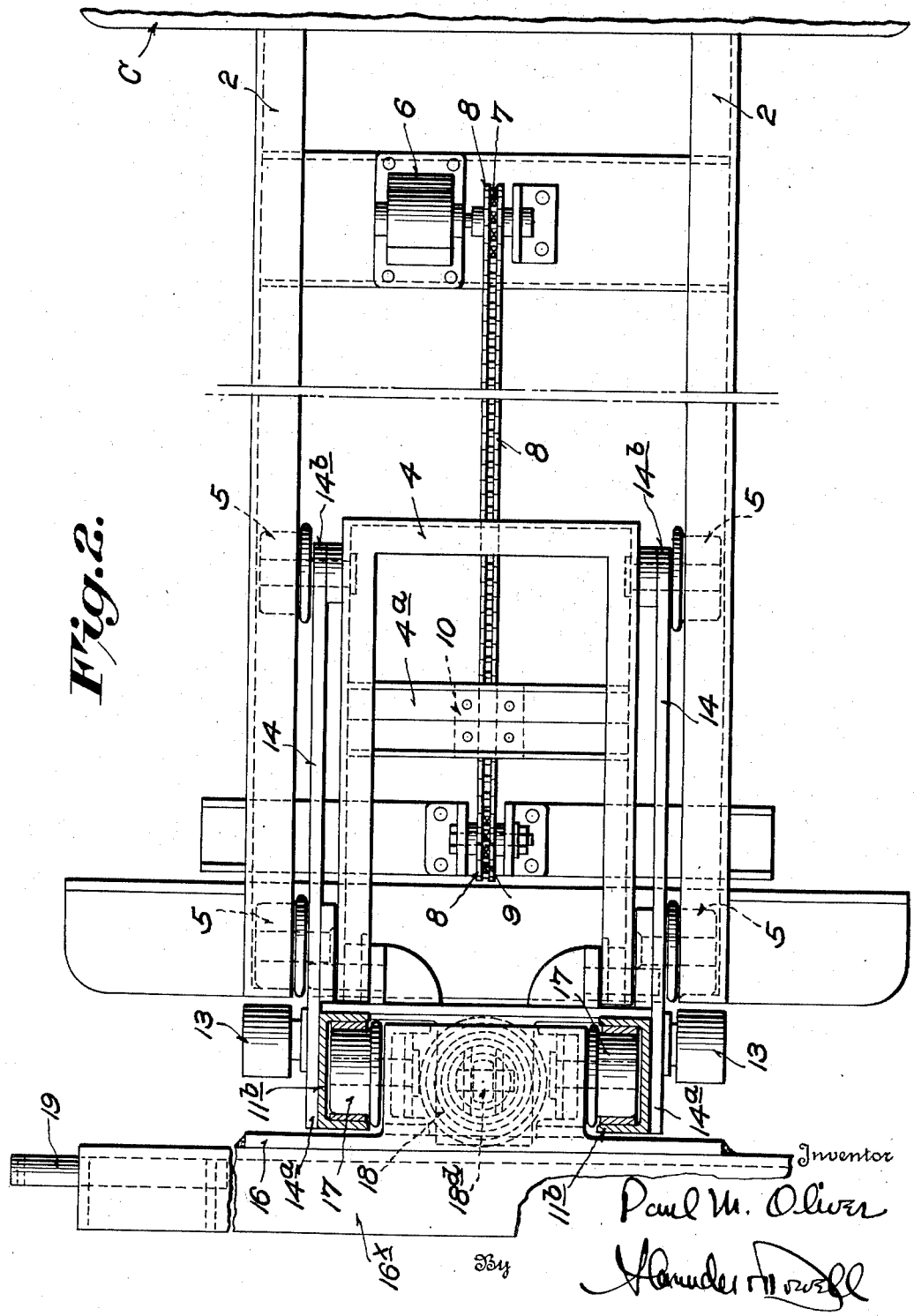

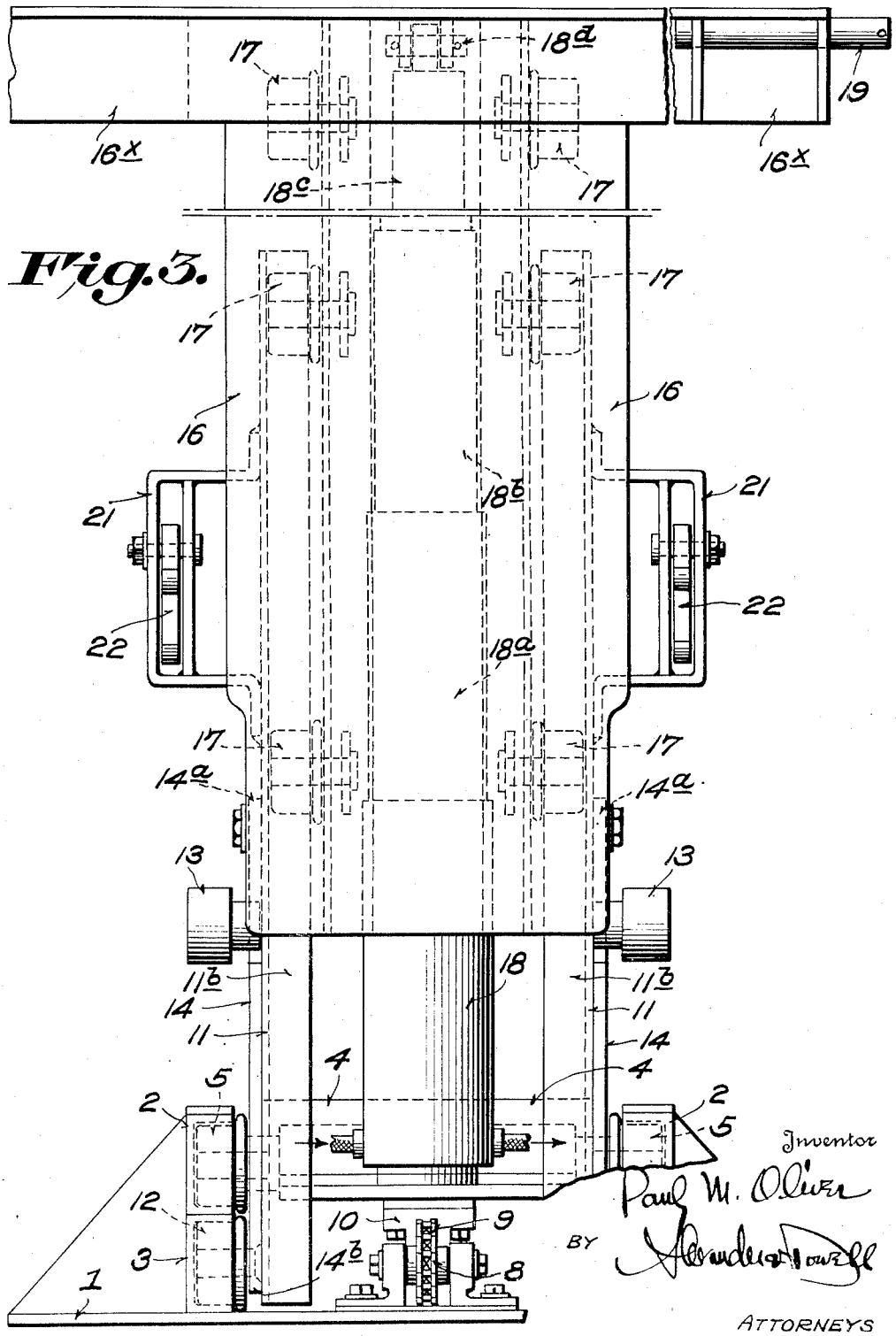

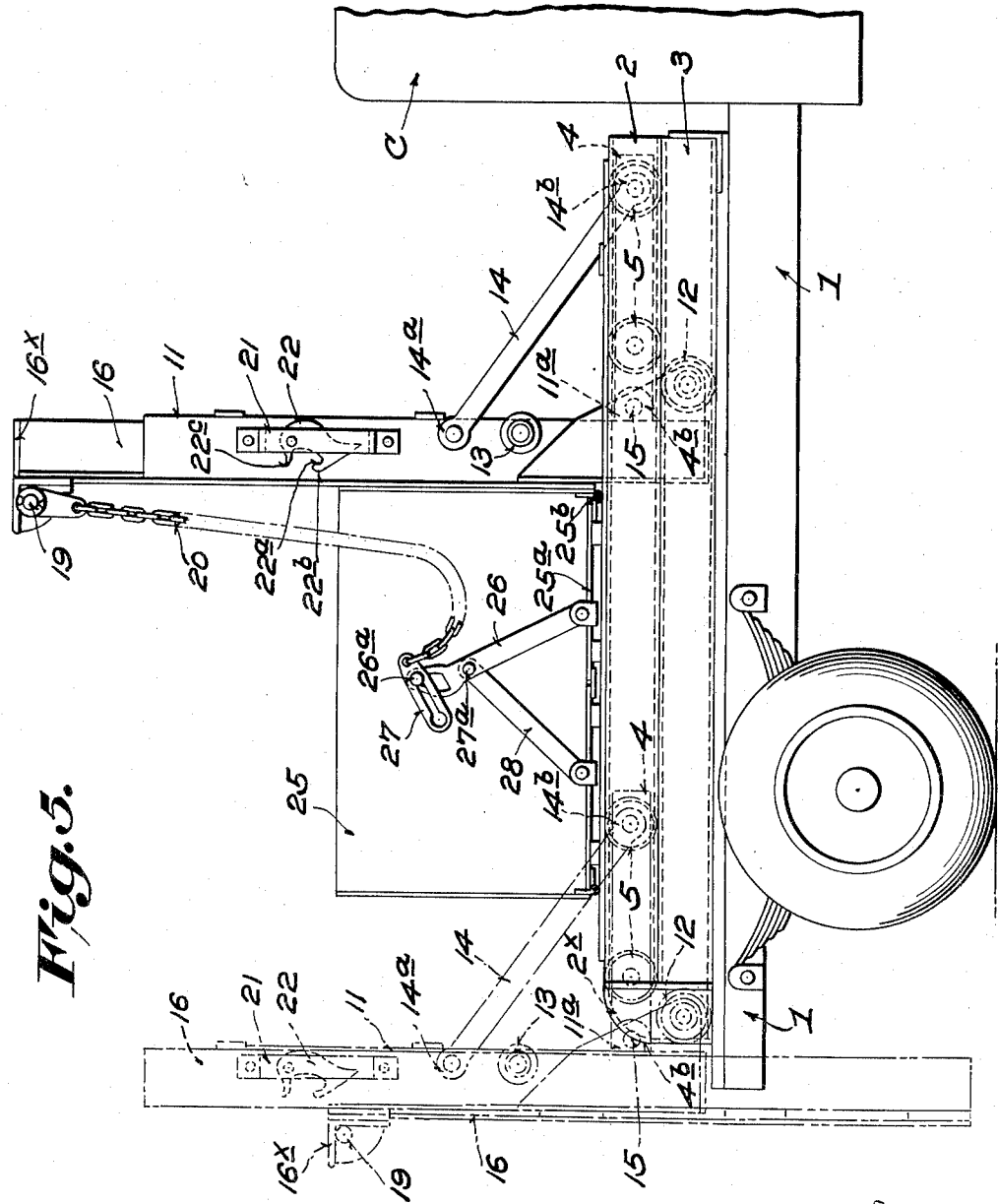

Patented Feb. 20, 1951

2,542,425

UNITED STATES PATENT OFFICE 2,542,425

DUMP BODY FOR TRUCKS

Paul M. Oliver, Knoxville, Tenn., assignor of one-third to William O. Matthews, Atlanta, Ga., and one-third to Paul E. Oliver, Knoxville, Tenn.

Application August 17, 1948, Serial No. 44,700

19 Claims. (Cl. 214—77)

My invention relates to power driven trucks having dumping beds, and more specifically to the type of truck which is capable of handling and/or lifting various types of detachable beds including a conventional dump truck bed to simplify material handling; also the versatility of handling various types of detachable beds, as well as conventional dump beds.

The primary object of my invention is to provide a power driven truck which will simplify the handling of objects or of materials in various shapes of detachable beds, and which are also handled in cooperation with conventional dump truck beds.

Another object of my invention is to provide a truck bed which is self-loading; that is, capable of picking up and orienting into operable position thereon the desired truck bed.

A further object of my invention is to provide a relatively simple yet rugged power driven truck bed handling mechanism, the elements of which are so arranged as to utilize the maximum mechanical advantage, so that heavy loads or beds may be handled with a minimum expenditure of power.

Still another object of my invention is to provide in one mechanism a dump bed handling mechanism which can move outwardly beyond the rear wheels and chassis of the truck to lift from the ground a bed and move it forwardly to rest in an upright position on the truck chassis, and which can be oriented to carry a conventional dump bed and can pivot about an axis near the rear of the truck chassis to raise the bed from a horizontal position to a vertical dumping position.

It is a further object of the invention to provide independently operated drive means for the horizontal and pivoting motions of the bed handling mechanism, and for the vertical lift elevator of the bed handling mechanism.

Other objects and advantages of my invention will become apparent during the discussion of the drawings, wherein:

Figure 1 is a right side elevation of a truck showing the bed handling mechanism in its two extreme positions.

Fig. 2 is a top plan view, partly in section, showing the bed handling mechanism in upright position.

Fig. 3 is a rear elevation showing the bed handling mechanism in upright position.

Fig. 4 is a side elevation showing the bed handling mechanism in partially raised position, with a conventional dumping body mounted thereon.

Fig. 5 is a similar side elevation showing the bed handling mechanism in upright position, and handling other type of detachable body.

Referring to the drawings, the truck chassis 1 carries on each side a pair of superimposed horizontal parallel channels, the upper channel 2 being secured to the lower channel 3 on each side, with the opposed open portions of the channels facing respectively inwardly to form an upper and a lower trackway.

Located between the opposed upper channels 2 is a dolly 4 supported therebetween by rollers 5 at each side, attached to the dolly 4 and disposed on opposite sides thereof to travel longitudinally in channels 2. The primed reference numbers indicate alternative positions of the parts in Figs. 1 and 5, wherein the parts are shown in several positions.

Between the lower channels 3 is a hydraulic motor 6 (Figs. 1 and 2) driving a sprocket 7 which in turn causes longitudinal travel of an endless chain 8 suspended between sprocket 7 and an idler sprocket 9, adjacent the rear end of the chassis, sprockets 7 and 9 being rotatably mounted on the truck chassis 1. Suspended downwardly from a bracket 4a (Fig. 2) on dolly 4 is a clamp 10 adapted to engage the top run of chain 8 so that longitudinal movement of chain 8 will cause corresponding longitudinal movement of dolly 4 between channels 2. The direction of rotation of motor 6 would be controlled from the operator's seat in cab C.

A moving carriage 11 is supported by two pairs of rollers, the rear rollers 12 (Figs. 1, 4 and 5) being adapted to roll between the channels 2 or 3 respectively, and the forward rollers 13 being provided to roll on top of the upper channels 2 when the carriage is lowered as shown in full lines in Figs. 1 and 4. A pair of arms 14 are journaled at 14a on the sides of carriage 11, and at 14b on the sides of the dolly 4, so that rearward travel of dolly 4 with respect to chassis 1 causes rearward travel of the carriage 11 until the rollers 12, which are then running rearwardly in the upper channels 2, engage the upper rounded boxed ends 2x (Figs. 1, 4 and 5) of the channels 2 whereupon the rollers 12 are directed downwardly into depressions (not shown) at the rear ends of the lower channels 3, further rearward movement of dolly 4 causing the carriage 11 to first tilt upwardly as shown in Fig. 4 and then to assume the vertical position shown in dot-and-dash lines in Figs. 1 and 5, the rollers 13 rising with the carriage 11 out of contact with the tops of channels 2, and the carriage 11 being then vertically supported by the rollers 12 and held in vertical position by the arms 14 as shown in Fig. 1. Near the rear of carriage 11 are a pair of lugs having holes 11a adapted to align with holes 4b (Fig. 5) in the rear end of dolly 4 when the carriage 11 is in the raised position shown in Fig. 5 so that the carriage may be locked in vertical position with respect to dolly 4 by means of pins 15 transfixing the holes 4b and the holes 11a in the said lugs. When the carriage 11 and dolly 4 are not locked together by pins 15, subsequent forward motion of the dolly returns the carriage to the position shown in solid lines in Fig. 1, the carriage 11 pivoting on rollers 12 seated at the ends of lower channels 3 as the carriage 11 tilts forwardly until the rollers 13 engage the tops of upper channels 2, whereupon the carriage fulcrums on rollers 13 lifting roller 12 around the boxed ends 2x so that same again enter the upper channels 2. When, however, the carriage 11 and dolly 4 are locked together by pins 15, forward motion of the dolly 4 will return the carriage 11 to the position shown in full lines in Fig. 5, rollers 12 moving in the lower channels 3.

Referring to Figs. 2 and 3, the carriage 11 carries a T-shaped elevator frame 16 arranged for axial movement with respect to carriage 11, the frame 16 having rollers 17 journaled at the sides thereof and running in the opposed channels 11b (Fig. 2) which form the sides of carriage 11.

Located between the carriage 11 and the elevator 16 is a hydraulic cylinder 18 of the multisleeve type adapted to raise or lower the elevator 16. The lower end of the cylinder 18 is mounted on the carriage 11 and the sleeves telescope outwardly as shown in Fig. 3, the sleeves 18a, 18b, and 18c forcing the elevator 16 upwardly and being pivotally connected to the head 16x of the elevator as at 18d (Fig. 3). On opposite sides of the head 16x of the elevator 16 are pins 19 serving to hold the upper ends of lifting chains 20 as shown in Figs. 1, 4 and 5.

On each side of the carriage 11 is a bracket 21 carrying a gravity operated hook 22 adapted to engage bails 23 on the dumping body. In the conventional dumping body 24 (Fig. 4) the bails 23 are shown as loops adapted to slide past the outer face of the hooks 22. The hooks 22 are provided in their outer faces with recesses 22a having upwardly extending lips 22b at their lower ends, and outwardly extending projections 22c at their upper ends, so that when the bails 23 are raised to a point between the lips 22b and projections 22c and then lowered, the bails 23 will engage behind the lips 22b and will thereby support the dumping body 24 suspended from the hooks 22. In order to disengage the bails 23 from the hooks 22 it is only necessary to further raise the dumping body 24, by further elevating the head 16x, which is connected to pins 24x on the body 24 by chains 20, to a point wherein the bails 23 ride over the projections 22c of the hooks 22, and then lowering the dumping body 24 by elevator 16, the lowering movement of the body 24 causing the bails 23 to engage the upper faces of projections 22c, thereby pivoting the hooks away from the body 24 until the bails 23 have passed entirely below the hooks 22, thus disconnecting the bails 23 from said hooks 22 automatically. Thus the dumping body 24 may be moved by the carriage 11 (and elevator 16) from a horizontal position disposed upon the chassis 1 behind cab C to its rearmost vertical position suspended by carriage 11 to positively dump the contents thereof, or it may be caused to assume any intermediate positions with respect to the chassis 1. The elevator 16 may be utilized to connect or disconnect the body 24 from the carriage 11 by engagement or disengagement of bails 23 from hooks 22.

In Figs. 1 and 5 a different form of dumping body 25 is shown supported by the same bed handling mechanism. In this modification the body 25 is open at the top, but may have a removable cover (not shown). The bottom 25a is hinged as at 25b to the lower rear wall of the body, and at the upper end of the rear wall of the body 25 are bails 23' (Fig. 1) identical with those carried by body 24 and similarly engaging the hooks 23, as shown in Fig. 1, to suspend the body 25 from the carriage 11 when the latter is in vertical position shown in Figs. 1 and 5. The bottom 25a is controlled by the elevator 16. As shown, an arm 26 is pivoted to bottom 25a and carries a pin 26a at its upper end to which the lower end of chain 20 is attached by means of a slotted plate 27. A second arm 28 is also pivoted to the bottom 25a and to the first arm 26, as at 27a (Fig. 5) so that when elevator 16 is raised the chains 20 will maintain the bottom 25a in closed position, but when the elevator is lowered as indicated in Fig. 1, the bottom 25a will swing downwardly to discharge the contents of body 25. By the above construction, the truck may be backed up against the body 25, and plates 27 engaged with pins 26a and body 25 raised vertically to engage bails 23' with hooks 22. Further raising of elevator 16 will then close the bottom 25a, and the body may be moved forwardly of the truck by manipulating motor 6 to bring the body 25 to rest upon the chassis 1 as shown in full lines in Fig. 5 for transportation purposes, the body 25 being subsequently positioned for dumping purposes by reversal of said operations.

*In operation*

The operation of the hydraulic motor 6 and that of the hydraulic cylinder 18 may be separately controlled by means in cab C not shown in the drawings. When the motor 6 is driving the chain 8 rearwardly, the dolly 4 is also traveling rearwardly and the drive is transmitted through arms 14 to the carriage 11 which rolls rearwardly on rollers 12 and 13, respectively. When the rollers 12 reach the rear end of the upper channels 2, the carriage pivots counterclockwise due to rollers 12 engaging boxed ends 2x acting as fulcrums so that the rollers 12 drop down into the rear ends of channels 3, said rollers 12 remaining in the rear ends thereof and acting as pivots for the lower end of the carriage 11 as it rises to its upright position. The hydraulic cylinder 18 may be controlled to operate the elevator 16 up or down to raise or lower the receptacles 24 or 25.

When the hydraulic cylinder 18 is fully contracted the lower end of elevator 16 extends below the carriage 11 nearly to the ground so that the lifting chains 20 may be attached to the receptacles 24 or 25. The cylinder 18 is then pumped up to raise the elevator 16 and receptacles 24 or 25 above the lower end of carriage 11. Reversal of the direction of travel of the chain 8 causes the dolly 4 to move forwardly pulling the carriage 11 forwardly at pivots 14a until the carriage has tilted to the position shown in Fig. 4. In this position, the rollers 13 again engage the tops of channels 2 and act as fulcrums about which the carriage 11 pivots, thus raising the rollers 12 into the upper channels 2 to permit the carriage to return again to its horizontal position shown in Fig. 1.

If, however, the carriage 11 has been connected in its upright position to the dolly 4 by inserting pins 15 through the holes 11a in the lugs and through the holes 4b in dolly 4, then forward motion of the chain 8 moves the carriage 11 forwardly in its upright position (Fig. 5) with the rollers 12 remaining in channels 3.

I do not limit my invention to the exact forms shown in the drawings, for obviously changes may be made therein within the scope of the claims.

I claim:

1. A dumping bed handling mechanism for a truck having a chassis, comprising longitudinally disposed horizontal upper and lower trackways secured on the chassis; said upper and lower trackways communicating at the rear ends thereof by downwardly curved boxed ends; a dolly suspended on rollers travelling in said upper trackways; means for longitudinally driving said dolly back and forth; a dumping bed carriage disposed above said trackways; a pair of rollers journaled at the rear of said carriage rolling in said trackways; means for transmitting movement of said dolly to a point on said carriage forward of said rollers; a pair of intermediate rollers journaled in said carriage between said rear rollers and said point and adapted to normally roll on the tops of said upper trackways; said rear rollers of said carriage, when the latter is in horizontal position, rolling in the upper trackways and during raising of the carriage said rollers, when reaching the boxed ends of the trackways, dropping into the lower trackways and serving as pivots for the vertical swinging movement of the carriage; and said intermediate rollers, when the carriage is swinging downwardly to contact the tops of the trackways, serving as pivots to raise the rear rollers of the carriage from the lower to the upper trackways.

2. In a mechanism as set forth in claim 1, said dolly driving means comprising an endless chain longitudinally disposed between the opposite trackways; a sprocket journaled in the chassis near the rear thereof adapted to engage said chain and act as an idler therefor; a second sprocket near the forward end of the chassis engaging said chain; means to drive said forward sprocket; and means subjacent said dolly and carried thereby for gripping the upper run of said chain.

3. In mechanism as set forth in claim 1, said movement transmitting means comprising a pair of parallel arms, the forward ends of the arms being journaled at opposite sides of the dolly, and the rear ends of the arms being journaled at opposite sides of the carriage forward of and adjacent to said intermediate rollers.

4. A dumping bed handling mechanism for a truck having a chassis, comprising longitudinally disposed horizontal upper and lower trackways secured on the chassis; said upper and lower trackways communicating at the rear ends thereof by downwardly curved boxed ends; a dolly suspended on rollers travelling in said upper trackways; means for longitudinally driving said dolly back and forth; a dumping bed carriage disposed above said trackways; a pair of rollers journaled at the rear of said carriage rolling in said trackways; means for transmitting movement of said dolly to a point on said carriage forward of said rollers; a pair of intermediate rollers journaled in said carriage between said rear rollers and said point and adapted to normally roll on the tops of said upper trackways; said rear rollers of said carriage, when the latter is in horizontal position, rolling in the upper trackways and during raising of the carriage said rollers, when reaching the boxed ends of the trackways, dropping into the lower trackways and serving as pivots for the vertical swinging movement of the carriage; and said intermediate rollers, when the carriage is swinging downwardly to contact the tops of the trackways, serving as pivots to raise the rear rollers of the carriage from the lower to the upper trackways; and means for locking said carriage in its upright position to said dolly, whereby when the dolly is moved forwardly the carriage and dolly will move as a unit, the rear rollers of the carriage moving in the lower trackways.

5. In mechanism as set forth in claim 4, said means for locking the dolly to the carriage comprising a pair of spaced lugs extending forwardly from said carriage when the latter is in the vertical position having holes therethrough; the rear portions of the dolly having other holes therethrough adapted to align with the holes in said lugs; and a pin transfixing the holes in said lugs and dolly.

6. A dumping bed handling mechanism for a truck having a chassis, comprising longitudinally disposed horizontal upper and lower trackways secured on the chassis; said upper and lower trackways communicating at the rear ends thereof by downwardly curved boxed ends; a dolly suspended on rollers travelling in said upper trackways; means for longitudinally driving said dolly back and forth; a dumping bed carriage disposed above said trackways; a pair of rollers journaled at the rear of said carriage rolling in said trackways; means for transmitting movement of said dolly to a point on said carriage forward of said rollers; a pair of intermediate rollers journaled in said carriage between said rear rollers and said point and adapted to normally roll on the tops of said upper trackways; said rear rollers of said carriage, when the latter is in horizontal position, rolling in the upper trackways and during raising of the carriage said rollers, when reaching the boxed ends of the trackways, dropping into the lower trackways and serving as pivots for the vertical swinging movement of the carriage; and said intermediate rollers, when the carriage is swinging downwardly to contact the tops of the tracks, serving as pivots to raise the rear rollers of the carriage from the lower to the upper trackways; an elevator frame on said carriage longitudinally movable with respect thereto; and means for driving said elevator frame.

7. In mechanism as set forth in claim 6, said dumping bed carriage comprising a carriage frame; longitudinal trackways fixed at the sides of said carriage frame; and said elevator frame being T-shaped, the upper member thereof forming an offset transverse lifting bar, and the major portion of the elevator frame lying between said carriage trackways; and rollers journaled in said elevator frame and engaging said trackways for longitudinal travel therein.

8. In mechanism as set forth in claim 7, said means for driving said elevator frame comprising a hydraulic cylinder fixed in the end of said carriage frame, the axis of the cylinder being parallel to said carriage trackways and lying therebetween; and a series of telescoping hydraulic piston sleeves extending outwardly from said cylinder toward said transverse lifting bar of the elevator frame, the outermost sleeve being fixed thereto to longitudinally drive said elevator frame.

9. In mechanism as set forth in claim 6, said dumping bed having bails at the sides thereof; means on said dumping carriage for automatically grasping the bails; and lifting chains extending downwardly from said elevator frame to said bed.

10. In mechanism as set forth in claim 9, said means for automatically grasping the bails on said bed comprising brackets fixed on each side of said carriage frame and extending laterally outwardly therefrom; gravity-operated hooks journaled near their tops in the brackets, said hooks having recesses in their outer edges forming upwardly extending lips at the lower ends of the recesses, and forming outwardly extending projections at the upper ends of the recesses; said lips and outward projections being adapted to brush against said bails as they are raised and lowered therepast, whereby when the bails are raised into positions between the lips and projections and subsequently lowered the bails will engage the hooks, and when the bails are raised above the projections and subsequently lowered the bails will pivot the hooks to prevent engagement thereof.

11. A dumping bed handling mechanism for a truck having a chassis, comprising longitudinally disposed horizontal upper and lower trackways secured on the chassis; said upper and lower trackways communicating at the rear ends thereof by downwardly curved boxed ends; a dolly suspended on rollers travelling in said upper trackways; means for longitudinally driving said dolly back and forth; a dumping bed carriage disposed above said trackways; a pair of rollers journaled at the rear of said carriage rolling in said trackways; means for transmitting movement of said dolly to a point on said carriage forward of said rollers; a pair of intermediate rollers journaled in said carriage between said rear rollers and said point and adapted to normally roll on the tops of said upper trackways; said rear rollers of said carriage, when the latter is in horizontal position, rolling in the upper trackways and during raising of the carriage said rollers, when reaching the boxed ends of the trackways, dropping into the lower trackways and serving as pivots for the vertical swinging movement of the carriage; and said intermediate rollers, when the carriage is swinging downwardly to contact the tops of the trackways, serving as pivots to raise the rear rollers of the carriage from the lower to the upper trackways; means for locking said carriage in an upright position to said dolly whereby when the dolly is moved forwardly the carriage and dolly will move as a unit, the rear rollers of the carriage moving in the lower trackways; an elevator frame on said carriage longitudinally movable with respect thereto; and means for driving said elevator longitudinally with respect to said carriage.

12. In a mechanism as set forth in claim 11, said dolly driving means comprising an endless chain longitudinally disposed between the opposite trackways; a sprocket journaled in the chassis near the rear thereof adapted to engage said chain and act as an idler therefor; a second sprocket near the forward end of the chassis engaging said chain; means to drive said forward sprocket; and means subjacent said dolly and carried thereby for gripping the upper run of said chain.

13. In mechanism as set forth in claim 11, said movement transmitting means comprising a pair of parallel arms, the forward ends of the arms being journaled at opposite sides of the dolly, and the rear ends of the arms being journaled at opposite sides of the carriage forward of and adjacent to said intermediate rollers.

14. In mechanism as set forth in claim 11, said means for locking the dolly to the carriage comprising a pair of spaced lugs extending forwardly from said carriage when the latter is in the vertical position having holes therethrough; the rear portions of the dolly having other holes therethrough adapted to align with the holes in said lugs; and a pin transfixing the holes in said lugs and dolly.

15. In mechanism as set forth in claim 11, said dumping bed carriage comprising a carriage frame; longitudinal trackways fixed at the sides of said carriage frame; and said elevator frame being T-shaped, the upper member thereof forming an offset transverse lifting bar, and the major portion of the elevator frame lying between said carriage trackways; and rollers journaled in said elevator frame and engaging said trackways for longitudinal travel therein.

16. In mechanism as set forth in claim 15, said means for driving said elevator frame comprising a hydraulic cylinder fixed in the end of said carriage frame, the axis of the cylinder being parallel to said carriage trackways and lying therebetween; and a series of telescoping hydraulic piston sleeves extending outwardly from said cylinder toward said transverse lifting bar of the elevator frame, the outermost sleeve being fixed thereto to longitudinally drive said elevator frame.

17. In mechanism as set forth in claim 11, said dumping bed having bails at the sides thereof; means on said dumping carriage for automatically grasping the bails; and lifting chains extending downwardly from said elevator frame to said bed.

18. In mechanism as set forth in claim 17, said means for automatically grasping the bails on said bed comprising brackets fixed on each side of said carriage frame and extending laterally outwardly therefrom; gravity-operated hooks journaled near their tops in the brackets, said hooks having recesses in their outer edges forming upwardly extending lips at the lower ends of the recesses, and forming outwardly extending projections at the upper ends of the recesses; said lips and outward projections being adapted to brush against said bails as they are raised and lowered therepast, whereby when the bails are raised into positions between the lips and projections and subsequently lowered the bails will engage the hooks, and when the bails are raised above the projections and subsequently lowered the bails will pivot the hooks to prevent engagement thereof.

19. In a truck, a dumping bed having bails at the sides thereof; a carriage frame adapted to be raised and lowered; and means on the sides of the carriage for automatically grasping the bails on said bed when the bails are moved therepast, comprising brackets fixed on each side of said carriage frame and extending laterally outwardly therefrom; gravity-operated hooks journaled near their tops in the brackets, said hooks having recesses in their outer edges forming upwardly extending lips at the lower ends of the recesses, and forming outwardly extending projections at the upper ends of the recesses; said lips and outward projections being adapted to brush against said bails as they are raised and lowered therepast, whereby when the bails are raised into positions between the lips and projections and subsequently lowered the bails will engage the hooks, and when the bails are raised above the projections and subsequently lowered the bails will pivot the hooks to prevent engagement thereof.

PAUL M. OLIVER.

REFERENCES CITED

The following references are of record in the file of this patent:

UNITED STATES PATENTS

| Number | Name | Date |
|---|---|---|
| 1,371,392 | Penfield | Mar. 15, 1921 |
| 2,126,289 | Schroeder | Aug. 9, 1938 |
| 2,251,435 | Anthony | Aug. 5, 1941 |
| 2,325,568 | Eaton | July 27, 1943 |
| 2,437,806 | Dempster | Mar. 16, 1948 |